(12) United States Patent
Rapp et al.

(10) Patent No.: US 7,724,135 B2
(45) Date of Patent: May 25, 2010

(54) COILED CABLE DISPLAY DEVICE

(75) Inventors: Michael Rapp, Hessen (DE); Rainer Brenner, Teningen-Kondringen (DE)

(73) Assignee: Checkpoint Systems, Inc., Thorofare, NJ (US)

( * ) Notice: Subject to any disclaimer, the term of this patent is extended or adjusted under 35 U.S.C. 154(b) by 0 days.

(21) Appl. No.: 12/237,689

(22) Filed: Sep. 25, 2008

(65) Prior Publication Data

US 2009/0033492 A1 Feb. 5, 2009

Related U.S. Application Data

(63) Continuation-in-part of application No. 11/693,352, filed on Mar. 29, 2007.

(60) Provisional application No. 60/976,094, filed on Sep. 28, 2007.

(51) Int. Cl.
*G08B 13/14* (2006.01)

(52) U.S. Cl. .............. 340/568.1; 340/568.3; 340/568.8; 211/119.003

(58) Field of Classification Search .............. 340/568.1, 340/568.2, 568.4, 568.3, 568.8, 571, 531, 340/538, 541; 211/119.003; 24/453; 248/551; 174/68.1; 53/507, 508
See application file for complete search history.

(56) References Cited

U.S. PATENT DOCUMENTS

| 3,885,773 | A |   | 5/1975  | Dunkelberger |
| 5,377,737 | A | * | 1/1995  | Moriya et al. ............ 160/84.06 |
| 5,552,771 | A |   | 9/1996  | Leyden et al. |
| 5,884,403 | A | * | 3/1999  | Rogers ....................... 30/296.1 |
| 6,039,496 | A | * | 3/2000  | Bishop .......................... 403/4 |
| 6,310,550 | B1 |  | 10/2001 | Wagener |
| RE37,590  | E |   | 3/2002  | Leyden et al. |
| 6,400,265 | B1 |  | 6/2002  | Saylor et al. |
| 6,578,683 | B1 |  | 6/2003  | Burke et al. |

(Continued)

FOREIGN PATENT DOCUMENTS

CA        2096603      11/1994

(Continued)

OTHER PUBLICATIONS

International Search Report dated Jan. 19, 2009 for International Application No. PCT/US2008/077932.

*Primary Examiner*—Toan N Pham
*Assistant Examiner*—Kerri McNally
(74) *Attorney, Agent, or Firm*—Caesar, Rivise, Bernstein, Cohen & Pokotilow, Ltd.

(57) ABSTRACT

A system for displaying an item includes a display shelf having an aperture through it and a thin tether having a first end and a second end that extends through the aperture. The first end of the tether is secured to a mount above a top side of said display shelf and the second end of said tether is secured adjacent to a bottom side of the displays shelf. The first end of the tether has a mount for connection of tether to the item, above the shelf. The system further includes a coiled cable coiled around the tether extending through the aperture. The coiled cable provides an electrical path to the item. The coiled cable has a first end and a second end. The first end is secured adjacent to the mount and the second end securely terminates below the bottom unexposed side of said display shelf.

1 Claim, 6 Drawing Sheets

U.S. PATENT DOCUMENTS

| | | |
|---|---|---|
| 6,659,382 B2 | 12/2003 | Ryczek |
| 6,690,277 B1 | 2/2004 | Hansen et al. |
| 6,700,488 B1 | 3/2004 | Leyden et al. |
| 6,799,994 B2 | 10/2004 | Burke |
| 6,828,909 B2 | 12/2004 | Script et al. |
| 6,879,961 B1 | 4/2005 | Pathirana |
| 6,896,543 B2 | 5/2005 | Fort et al. |
| 6,946,961 B2 | 9/2005 | Frederiksen et al. |
| 7,002,467 B2 | 2/2006 | Deconinck et al. |
| 7,021,091 B2 | 4/2006 | Leyden et al. |
| 7,053,774 B2 | 5/2006 | Sedon et al. |
| 7,081,822 B2 | 7/2006 | Leyden et al. |
| 7,132,952 B2 | 11/2006 | Leyden et al. |
| 7,135,972 B2 | 11/2006 | Bonato |
| 7,154,039 B1 | 12/2006 | Marszalek et al. |
| 7,202,417 B2 | 4/2007 | Marszalek et al. |
| 7,202,786 B2 | 4/2007 | Marszalek et al. |
| 7,204,107 B2 | 4/2007 | Leyden et al. |
| 7,209,038 B1 | 4/2007 | Deconinck et al. |
| 7,327,276 B1 | 2/2008 | Deconinck et al. |
| 7,375,638 B2 | 5/2008 | Light et al. |
| 2001/0054952 A1 | 12/2001 | Desai et al. |
| 2003/0034890 A1* | 2/2003 | Baumeister et al. ...... 340/568.1 |
| 2003/0069964 A1 | 4/2003 | Shteyn et al. |
| 2005/0134458 A1* | 6/2005 | Leyden et al. ............ 340/568.2 |
| 2005/0263315 A1* | 12/2005 | Marszalek et al. .......... 174/108 |
| 2006/0097875 A1* | 5/2006 | Ott ......................... 340/572.1 |
| 2007/0152819 A1* | 7/2007 | Marszalek et al. ....... 340/568.4 |
| 2007/0194918 A1 | 8/2007 | Rabinowitz et al. |
| 2007/0229259 A1 | 10/2007 | Irmscher et al. |

FOREIGN PATENT DOCUMENTS

| | | |
|---|---|---|
| DE | 19528178 A1 | 2/1997 |
| DE | 19726413 A1 | 1/1999 |
| DE | 10250004 A1 | 5/2004 |
| DE | 10250339 A1 | 5/2004 |
| DE | 202005015472 U1 | 1/2006 |
| DE | 202005016181 U1 | 2/2006 |
| DE | 102004053426 A1 | 5/2006 |
| EP | 1030284 A1 | 8/2000 |
| EP | 1417912 A1 | 5/2004 |
| GB | 2 440 600 A | 2/2008 |
| JP | 2001243564 | 9/2001 |
| JP | 2005309521 | 11/2005 |
| WO | 02090693 A1 | 11/2002 |
| WO | 03032240 A2 | 4/2003 |

* cited by examiner

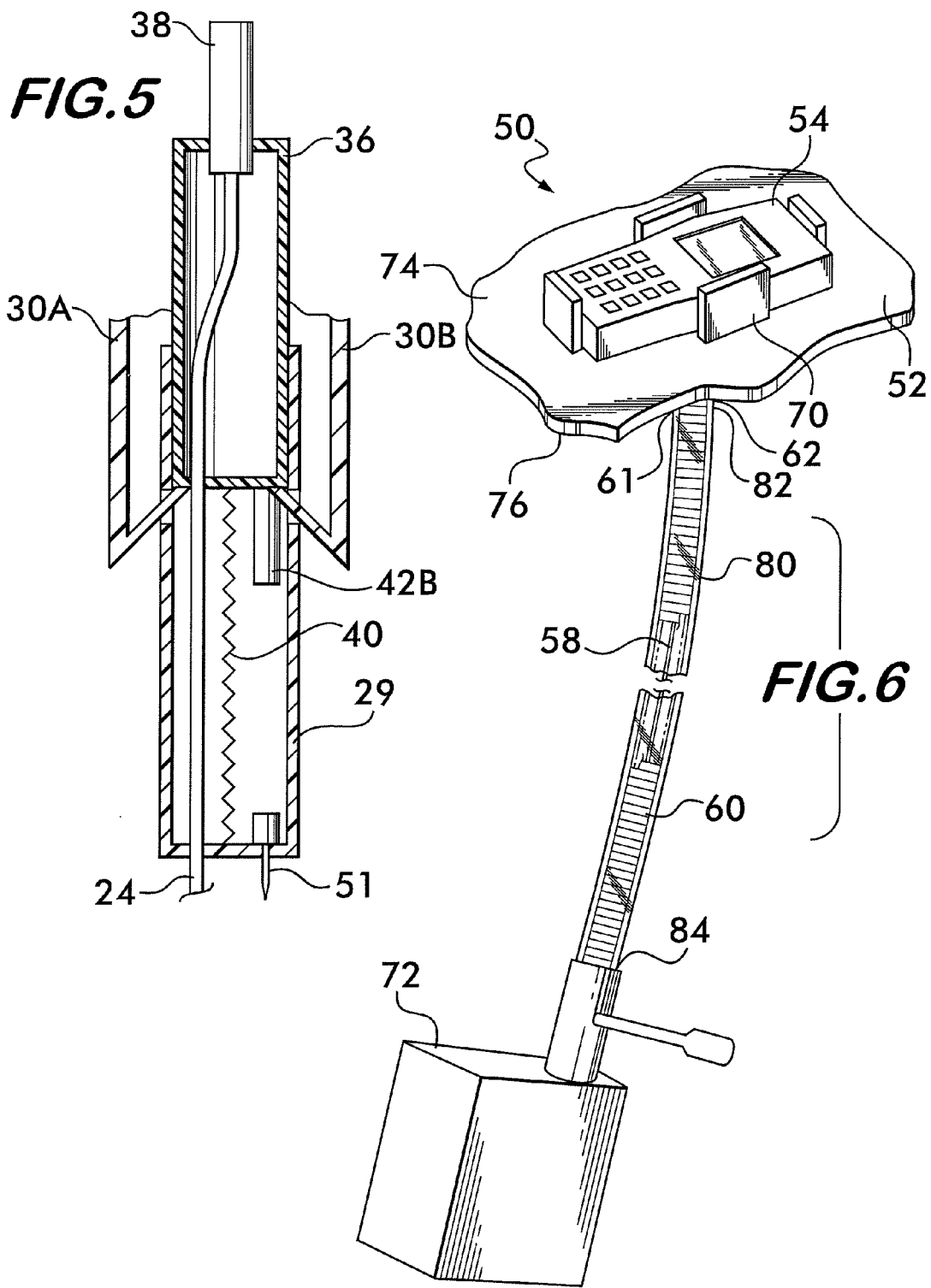

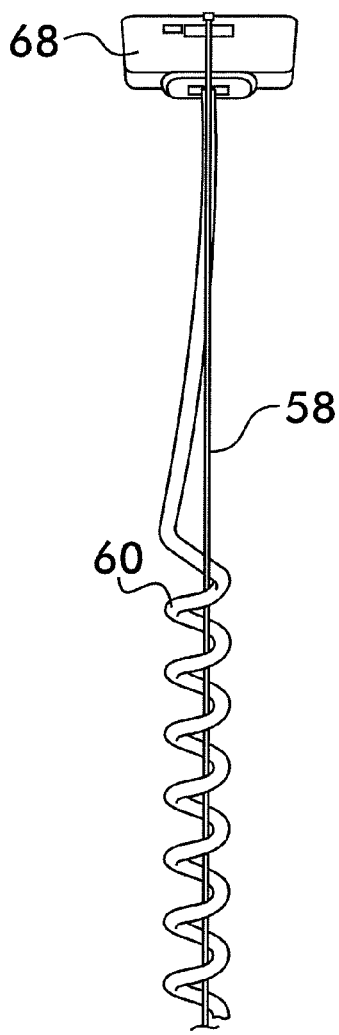
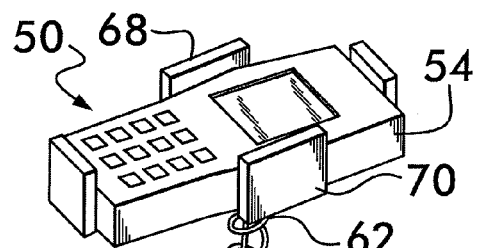
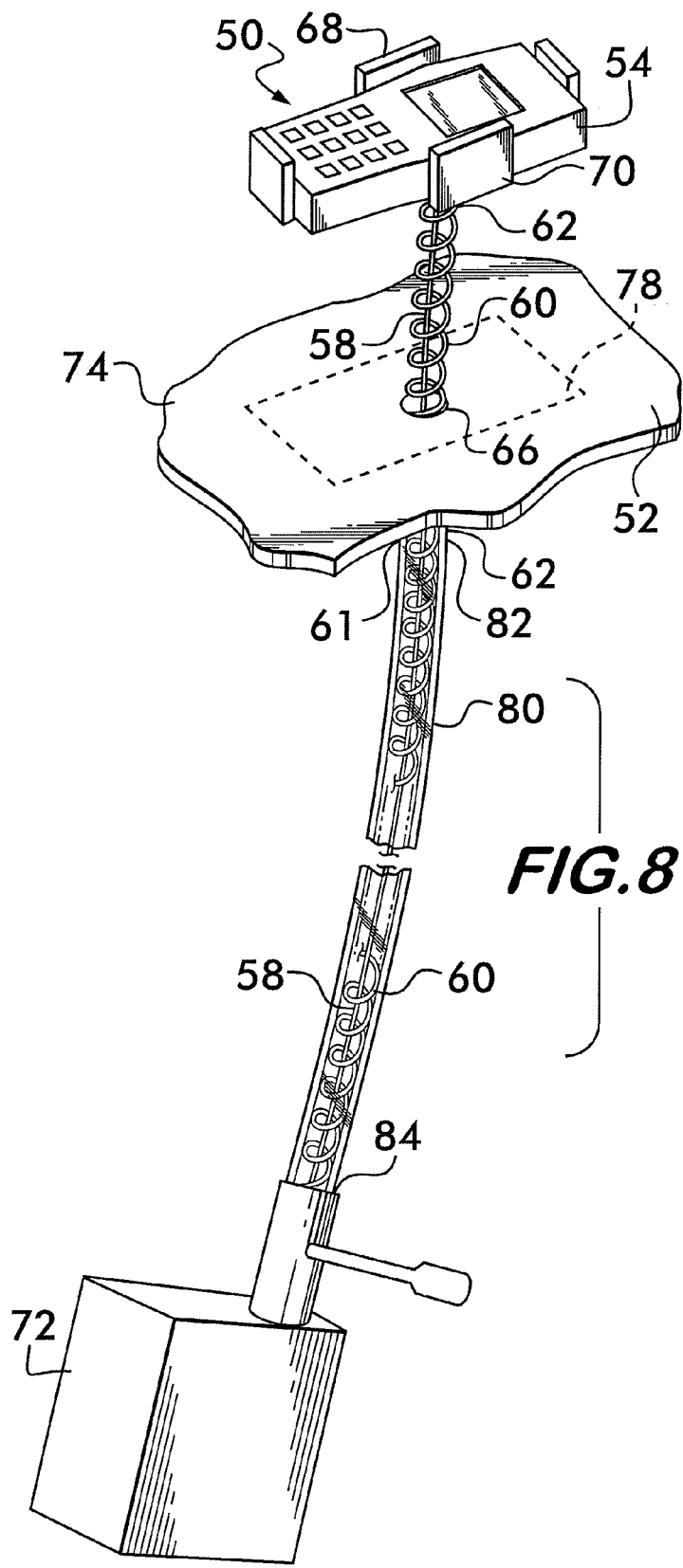

COILED CABLE DISPLAY DEVICE

CROSS REFERENCES TO RELATED APPLICATIONS

This application is a continuation-in-part application of U.S. application Ser. No. 11/693,352, filed on Mar. 29, 2007, entitled System and Method for Securing and Displaying Items for Merchandising and also claims priority to U.S. Provisional Application No. 60/976,094, filed on Sep. 28, 2007, entitled Coiled Cable Display Device, the entire disclosures of which are fully incorporated by reference herein.

BACKGROUND OF THE INVENTION

The current invention relates generally to the displaying of items for merchandising purposes and, more specifically, to a system for displaying items on a counter or similar structure in a commercial environment while protecting the items from theft.

The surveillance of freely presented objects to protect them against theft by means of a sensor that is connected to a monitoring and alarm device via an electrical line is known in the art. Such items are commonly displayed on a counter or other structure for viewing by prospective purchasers. When the line or the anti-theft installation is manipulated or the sensor is removed, the monitoring and alarm device sets off an audible and/or visual alarm. It has been proposed to provide an apparatus providing for reliable surveillance of the displayed object and requiring a comparatively small outlay particularly in equipment and installation, by providing an audible alarm at the counter or a visual alarm at the display device when the a user attempts to remove the item.

Typically, a free presentation includes a plurality of objects. When, as a further action, events are counted and/or date and/or time of the day are saved, the detections may be stored with date and time of the day for later reference in statistical analyses in order to obtain information about the attractiveness of the object put on display. For this purpose, the monitoring and alarm device includes a storage memory for storing the event count and/or date and/or time of the event.

The sensor of the logging device may be a motion sensor. It may operate to start a product information display when a prospective buyer approaches or stands in front of the item on display. No additional action is required in this case. However, the possibility also exists for the sensor of the logging device to be a removal sensor.

The sensor of the logging device may be a switch, in particular, a mechanical or capacitive or inductive or opto-electronic or magnetic switch. Particularly advantageously, the sensor of the logging device is part of the anti-theft sensor arrangement, because this enables multiple uses to be made of existing equipment. Moreover, the anti-theft sensor arrangement preferably includes a sensor affixed to the item to be secured, which sensor is connected to the monitoring and alarm device through a cable wound on a cable retractor, with the sensor of the logging device being configured to detect when the wound-up cable is being pulled off the cable retractor. The cable retractor provides for a "neat" presentation. The sensor may be configured as a magnetic switch comprising a reed contact mounted on the enclosure of the cable retractor and a magnet fitted to the pull-out type cable. In this arrangement it is suitable for the magnet fitted to the cable to be constructed as a cable stop resting against an abutment with the cable in roughly wound-up condition. Such a sensor arrangement affords, among other things, the advantage of being able to be retrofitted with ease.

There are various known display devices that provide both security and the capability to carry a signal from, for example, the sensor affixed to the item, or carry a power signal to power the item. However, it would be beneficial to provide a display device that cleanly and neatly provides for both security and appropriate electrical signals to be carried.

While the aforementioned apparatus and method are primarily concerned with the securing of items of merchandise, As should be appreciated by those skilled in the art, that while the foregoing proposed method and apparatus appears generally suitable for its purposes, it still leaves something to be desired from the standpoint of effective advertising and promotion of the items. In this regard, while the provision of an audible alarm at the counter (or even a visual alarm on the display device on or adjacent the counter), may have the effect of deterring or preventing theft, it creates a negative atmosphere, e.g., other potential customers in the vicinity of the display may be frightened or otherwise put off by a sounding alarm indicating a theft has occurred. Thus, a need exists for a system and method which provides the advantages of enabling persons to readily examine an item, to receive information relevant to that item when they pick up or touch the item, while providing against theft by producing a wireless signal to authorized personnel located remotely from the display.

All references cited herein are incorporated herein by reference in their entireties.

SUMMARY OF THE INVENTION

A system for displaying an item includes a display shelf having an aperture through it and a thin tether having a first end and a second end that extends through the aperture. The first end of the tether is secured to a mount above a top side of said display shelf and the second end of said tether is secured adjacent to a bottom side of the displays shelf. The first end of the tether has a mount for connection of tether to the item, above the shelf. The system further includes a coiled cable coiled around the tether extending through the aperture. The coiled cable provides an electrical path to the item. The coiled cable has a first end and a second end. The first end is secured adjacent to the mount and the second end securely terminates below the bottom unexposed side of said display shelf.

The second end of the thin tether is preferably connected to a spring loaded tether take-up reel, thereby causing the first end of the tether to be biased toward the aperture of the display shelf. A hollow tube may be disposed between the take up reel and the shelf to accommodate the coiled cable in a retracted position and a portion of the tether.

The second end of the thin tether may, alternatively, be connected to a free-hanging weight located beneath the aperture, thereby causing the first end of the tether to be biased toward the aperture of the display shelf.

The top exposed side of the display shelf may have a stand for holding the item. The bottom side has a hollow tube and may be connected to the display shelf for accommodating a portion of the tether and coiled cable. The hollow tube has a top end and a bottom end. The top end is preferably secured to the display shelf, such that the portion of the tether and coiled cable are enclosed by the hollow tube when the mount is seated on the stand.

Preferably, the tether is fabricated from a cut resistant metal cable to prevent theft of the item.

An event sensor may be associated with the item that detects the manipulation of, or approach of a user to the item.

Here, the event sensor is coupled to a monitoring and alarm apparatus. The event sensor emits a sensor signal to a monitoring and alarm apparatus corresponding to the manipulation of, or approach of a user to the item. The monitoring and alarm apparatus includes a transmitter, arranged to automatically provide a wireless signal in the event that a person removes the item from the vicinity of the counter or other structure, and a receiver being arranged to receive the wireless signal to alert an authorized person of the removal of the item from the vicinity of the counter or other structure.

The event sensor may be coupled to the item at a first end of the coiled cable wherein the first end of the tether is coupled to the item and the second end of the coiled cable is coupled to the monitoring and alarm apparatus. The coiled cable is arranged to carry an electrical signal generated by the event sensor, indicative of a person approaching, touching or picking up the item.

Preferably, the tether physically secures an electronic item to the display shelf to deter unauthorized removal of the item from the display shelf. Here, the coiled cable includes a power conductor and a sensor signal conductor, the power conductor and sensor signal conductor having ends that are contained within a powerjack that couples to the electronic item for powering or charging the electronic item.

The mount may further include a cradle that holds the item and which comprises members that releasably secure a power jack to the item.

Finally, the mount may be a battery-type mount adapted to replace a standard battery supplied with the item. The mount utilizes standard battery mounting fasteners supplied with the item where the battery-type mount has theft resistant fasteners.

BRIEF DESCRIPTION OF SEVERAL VIEWS OF THE DRAWINGS

The invention will be described in conjunction with the following drawings in which like reference numerals designate like elements and wherein:

FIG. 5 is a cross-sectional view of the power jack of FIG. 4 shown in the extended condition when connected to the electronic device;

FIG. 6 is an isometric view of a system for displaying an item in accordance with another preferred embodiment of the present invention, shown with the item (a portable phone) in a retracted position;

FIG. 7 is a side isometric view of a coiled cable surrounding a tether and mount for use the system for displaying an item of FIG. 6;

FIG. 8 is an isometric view of the system for displaying an item of FIG. 6, shown with the portable phone in an extended position, away from an accompanying display shelf;

DETAILED DESCRIPTION OF THE INVENTION

Figure 1:
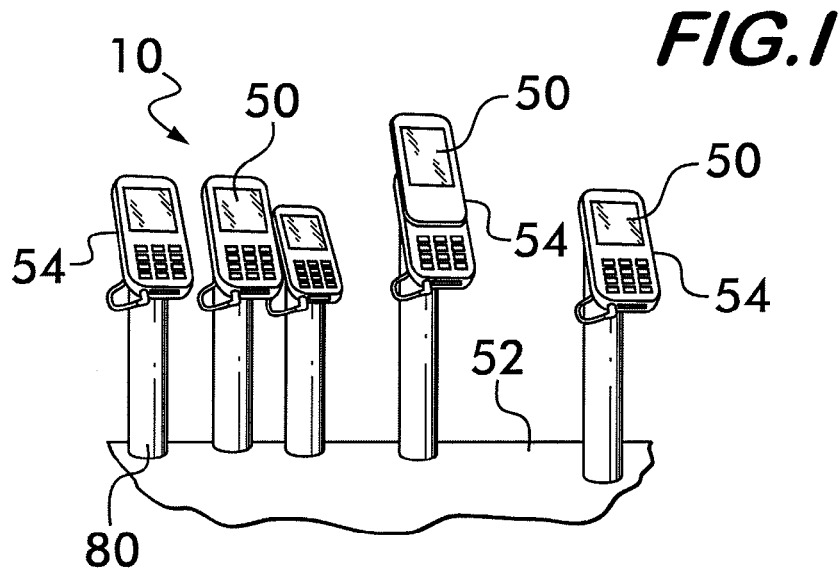
FIG. 1 is an isometric view of a display having a plurality of systems for displaying an item in accordance with a preferred embodiment of the present invention, each shown with a portable phone in a retracted position.

Referring now to the various figures of the drawing wherein like reference characters refer to like parts throughout the several views, there is shown in FIG. 1 a plurality of systems for displaying an item 10, for example, a mobile electronic device, such as a cellular telephone, camera, portable DVD/CD player, memory stick, camcorder, or the like, so that potential customers can approach a display shelf or other structure where such items are being displayed to examine them. In some cases, information about the items may be shown via an associated graphics display located at or adjacent to the counter or other structure at which the items are located (not shown). The display 10 may include audible transducers for providing sound with the visual display. See, for example, U.S. patent application Ser. No. 11/693,352, the complete specification of which is fully incorporated by reference hereto.

In the prior art, apparatus have included a theft detection sensor that is affixed to the object to be secured which is connected to a monitoring and alarm device by means of a cable. When the sensor responds when removed from the object or when the cable is severed or manipulated, a theft alarm is produced. The monitoring and alarm device comprises, among other things, memory for event or occurrence counts (e.g., object manipulation) and a means to track date and time of occurrence. A further improvement of the alarm device is the provision of a transmitter that provides a wireless signal to a store manager or store employee's PDA (personal digital assistant) or cell phone, or other wireless receiver, or to a secure monitor that alerts the individual that a theft is in progress. The signal also provides identification of the item being stolen and its location in the retail establishment. Thus, instead of setting off a general alarm, a "silent alarm" or "specified alarm" is provided to the proper personnel that can take swift and appropriate action without alarming the other customers in the vicinity.

Figure 2:
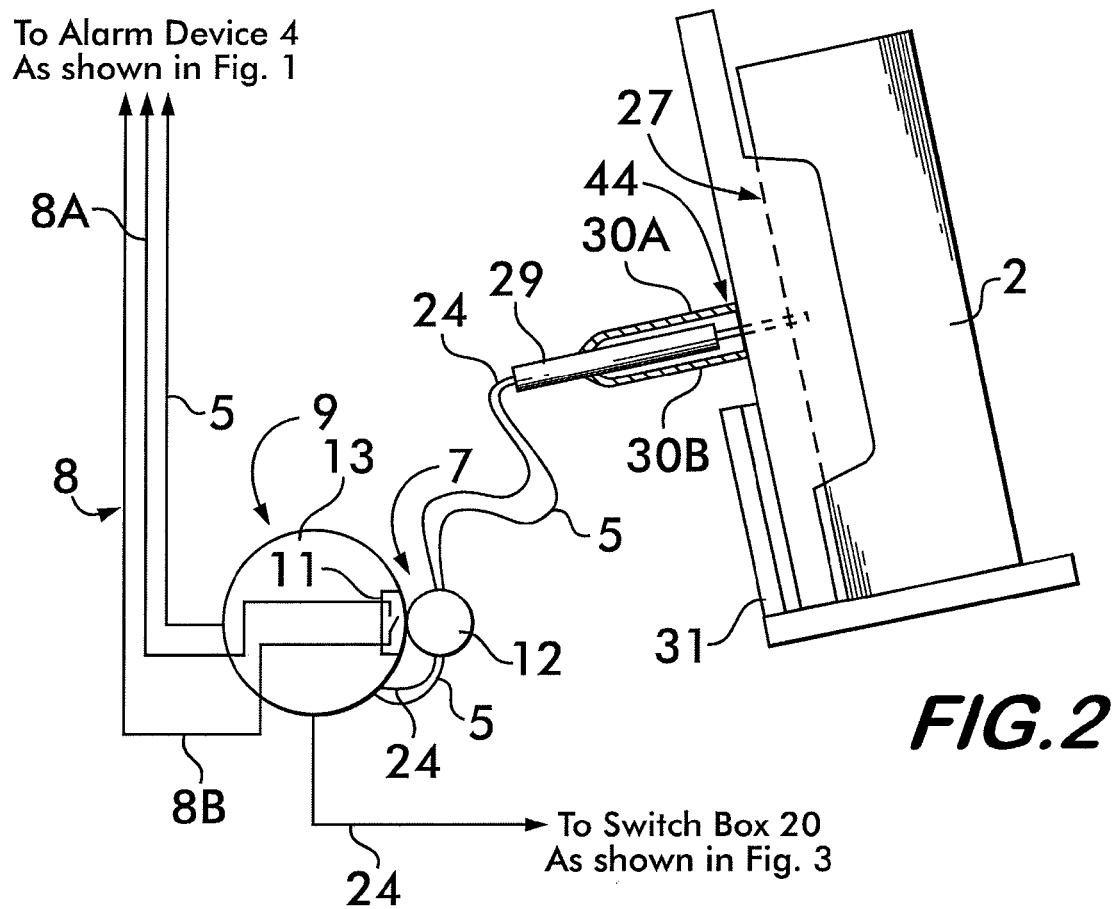
FIG. 2 is a functional view of the powering/charging feature of the present invention whereby power/charge is provided to an electronic item along with theft detection.

As can be seen in the system of FIG. 2, when a person approaches or removes the item 2 on display, this will be recorded by a logging device. In the embodiment shown, the logging device includes an "event sensor" or "removal sensor" (e.g., theft detection sensor 7) which is in controlling communication with a monitoring and alarm device provided as antitheft device via a cable 8, so that both functions require only one shared monitoring and alarm device.

In the prior art, the cable connected to the theft detection sensor 7 is wound on a cable retractor 9. The sensor 7 is configured to detect when the wound up cable 5 is being unwound from the cable retractor 9. In the embodiment shown, the sensor 7 is constructed as a magnetic switch having a reed contact 11 fitted to the cable retractor enclosure 13 as well as a magnet 12 fitted to the wound up cable 5. The reed contact 11 is preferably embedded in plastic and may be mounted on or in the cable retractor enclosure 13. The cable 8, formed by reed contact conductors 8A, 8B, provides the monitoring and alarm device with the reed contact 11 state. Aside from its function as a permanent magnet 12 for switching the reed contact 11 as soon as the magnet 12 leaves its position of rest when the cable 5 is pulled out, causing the magnetic field at the reed contact 11 to be interrupted, the magnet 12 has the added function of a cable stop for pull-relief of the cable 5 and the connected sensor in the rest position. In this arrangement, the magnet 12 affixed to the cable 5 functions as a cable stop (or cable-restraining detent, whereby if the cable 5 is rolled completely out, the magnet acts as a counter detent), resting in roughly wound-up condition of the cable 5 against an abutment defined by the enclosure 13 in this embodiment. It is particularly advantageous in this arrangement for the sensor 7 to be retrofittable easily, to be a low-cost and sturdy item and to require little space.

Figure 3:
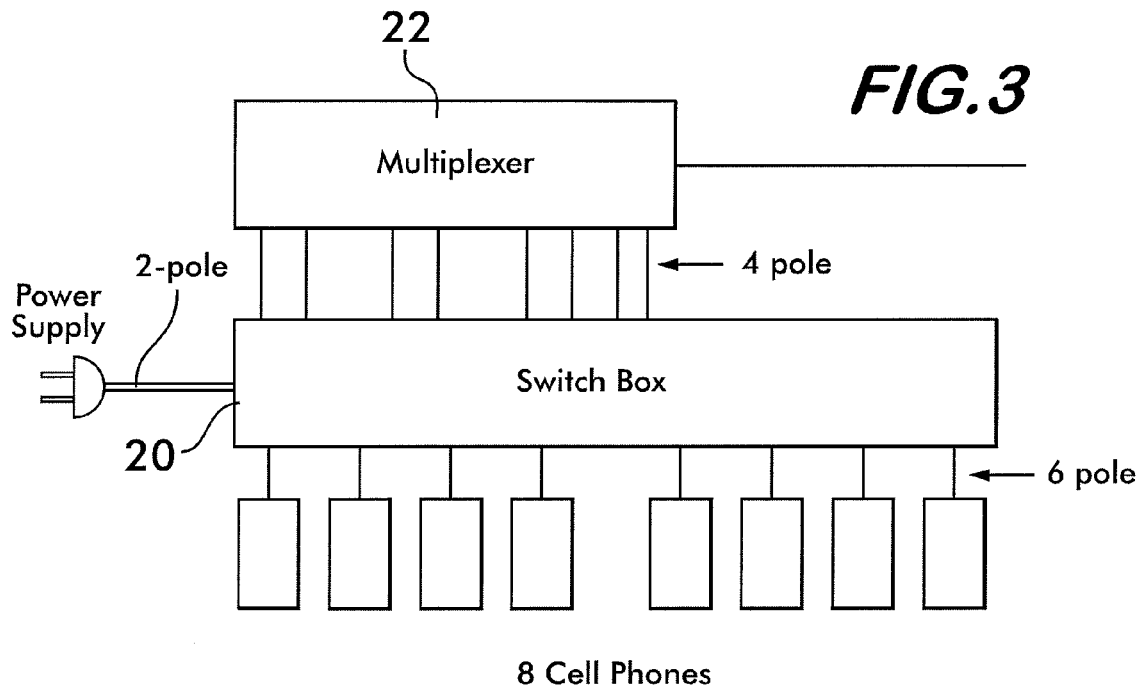
FIG. 3 depicts a preferred embodiment of a powering feature of the system and method for protection against theft for powering/charging electronic devices on display while providing theft detection and product advertisement initiation.

FIG. 3 depicts another feature of the system and method of the present invention: charging or powering the items (electronic devices) on display, while keeping these items secure. Thus, not only is theft protection provided by the system of the present invention, but so is the powering of these devices. By way of example only, as can be seen in FIG. 3, eight cellular phones that are displayed can be powered through a switch box 20 which is connected to a single power supply. Under the control of a multiplexer 22, the switch box 20 alternates the charging of the eight phones every predetermined number of minutes (this time interval can be modified as desired) so that a smaller power supply can be used (2 pole). The eight items (e.g., cell phones) may be connected to the switch box 20 via eight, 6-pole conductors wherein the switch box 20 is controlled via eight, 4-pole conductors. Alternatively, constant charging of all products could be possible as well with a stronger power supply. Each displayed cell phone is connected to one sensor (e.g., via adhesive pad) which secures and charges the product.

Figure 4:
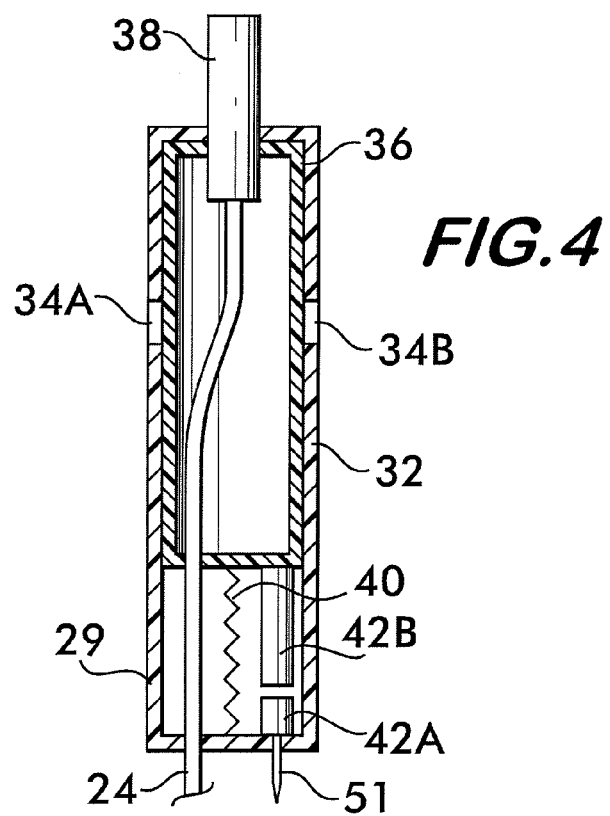
FIG. 4 is a cross-sectional view of an exemplary powerjack for use in the embodiment of FIG. 3 and shown in the unconnected condition.

Another feature of the present invention is shown in FIGS. 2-5. Here, the ability to power the electronic device on display, as well as the theft alert detection are provided via a tether. In particular, as shown in FIG. 4, the theft detection sensor comprises proximity sensor or reed switch 42A with cable 51 providing the sensor signal path. An item cradle 27 (see FIG. 3) holds the item 2 (i.e., the electronic device). An aperture (not shown) in the cradle 27 permits the insertion of a power jack 29 into the electronic device 2 to keep it powered. A pair of fingers or coupling members 30A and 30B (e.g., molded to the back of the cradle 27) secure the power jack 29.

FIG. 4 is a cross-sectional view of a preferred embodiment of a power jack 29 in the unconnected state. The jack 29 comprises an outer housing 32 having a pair of apertures 34A and 34B on opposing sides of the housing 32. Concentrically and slidably mobile within the housing 32 is an electrode element 36 for supporting power electrode 38 which receives power through power conductor 24. The base of the electrode element 36 is coupled to the base of the housing 32 using a spring 40. A proximity sensor, or reed switch 42A (attached to the inside base surface of the housing 32) having an associated sensor conductor 51 includes a corresponding element 42B (e.g., magnet) attached to the base surface of the electrode element 36. In order to connect the powerjack 29 to the electronic device 2, store personnel need to pull the electrode element 36 out of the housing 32 and to allow the coupling members 30A and 30B to pass through the respective apertures 34A, 34B as shown in FIG. 5. This can be accomplished by the person pressing the coupling members 30A, 30B at the neck 44 (see FIG. 3) to spread the ends of the coupling members 30A, 30B and to allow the coupling members 30A, 30B to pass through the apertures 34A, 34B and to capture the bottom surface of the electrode element 36 against the bias of the stretched spring 40. The electrode 38 can be inserted through the aperture (not shown) in the cradle 27 and into the power receptacle (not shown) of the electronic device 2. In this position, the proximity sensor or reed switch 42A is displaced away from the corresponding element 42B. In this position, the signal conductor 5 conveys a "non-theft" condition to the alarm device. As a result, the electronic device 2 is being powered while a "non-theft" condition signal is provided to the alarm device (not shown) and if a customer grasps the electronic device 2 and manipulates it, the theft detection sensor 7 is activated to initiate the product advertisement. Should a thief attempt to disconnect the electronic device 2 by jerking the device 2 away from the power jack 29, or being savvy enough to squeeze the coupling members 30A, 30B together to release the power jack 29, the electrode element 36 snaps towards the base surface of the housing 32 due to the spring 40 bias, and the proximity sensor (reed switch 42A) detects the corresponding element 42B and reports the theft condition. Thus, by use of the configuration shown in FIGS. 2-5, powering/charging, anti-theft and product advertisement initiation are accomplished.

A preferred embodiment of a system for displaying an item 50 in accordance with the present invention is shown in FIGS. 1 and 6-10. The system 50 includes a display shelf 52, such as a counter or other type of display unit for displaying an item 54, such as a portable telephone or camera. The display shelf 50 has a hole or aperture 66 (see, e.g., FIG. 8) through it to provide for a thin security tether 58 and electrical connection (coiled cable 60), as will be described in greater detail below.

Preferably, the tether 58 is a thin metal cable having a first end 62 and a second end 64. The first end 62 of the tether 58 extends through the aperture 66 in the display shelf 52 and has a mount 68 (See FIG. 7) on it to connect either directly or indirectly (via, for example, cradle 70) to the item 54. The display shelf 52 has a top, exposed side 74 and a bottom, unexposed side 76. The coiled cable 60 and the security tether 58 are coaxial, in the sense that the coiled cable 60 is coiled around the security tether 58 as shown, for example, in FIG. 7. The coiled cable 60 has a first end 61 and a second end 63 and includes one or more conductors that provide electrical paths for providing power and/or electrical signal and/or a security alarm signal to/from the item 54.

The second end 64 of the tether 58 is secured below the shelf 52 (the bottom, unexposed side 76), which may be in a cabinet or other similar structure. Slack is provided by the tether 58 such that the item 54 can be moved away from the display shelf 52 for a certain desired distance, but upon reaching that distance, the item 54 remains fixed to the tether 58 and the tether remains fixed such that theft is not possible without cutting the tether 58 (and its surrounding coiled cable 60).

Optionally, the slack in the tether 58 may be taken up by a spring-loaded take-up reel (located, for the present example, in reel box 72) such that the first end 62 of the tether 58 is biased to a retracted position in the reel box 72 (such that the first end 62 of the tether 58 is biased toward the aperture 66 in the display shelf 52). Take-up reels are commonly available and are well known and will not be further described herein. Slack in the coiled cable is controlled inherently by the coils of the coiled cable 60. The coils of the coiled cable 60 slide along the tether and open and close with respect to one another as the item 54 moves in relation to the shelf 52.

Figure 9:
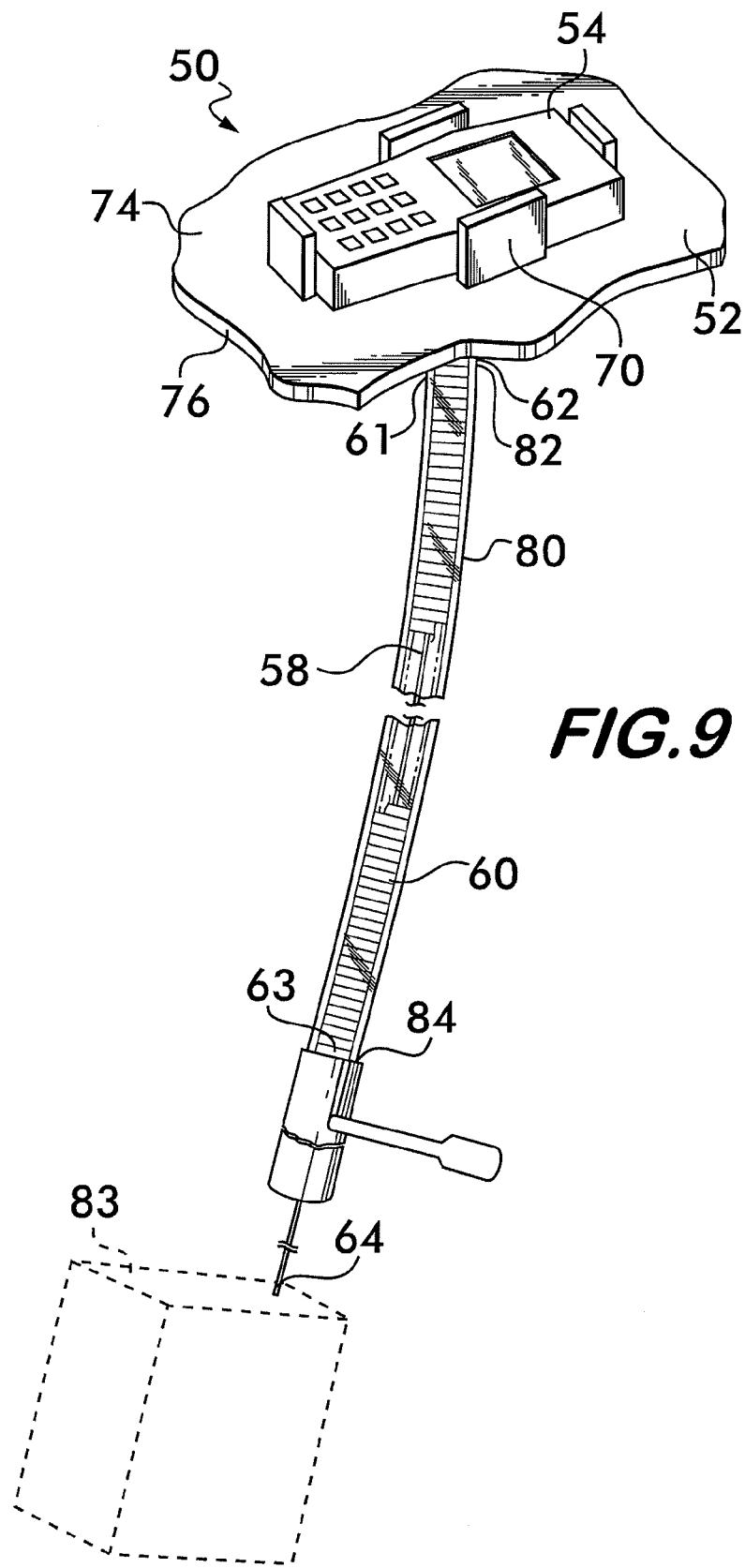
FIG. 9 is an isometric view of an alternate embodiment of a system for displaying an item in accordance with another preferred embodiment of the present invention, shown without having a take up reel, shown with a portable phone in a retracted position.
Figure 10:
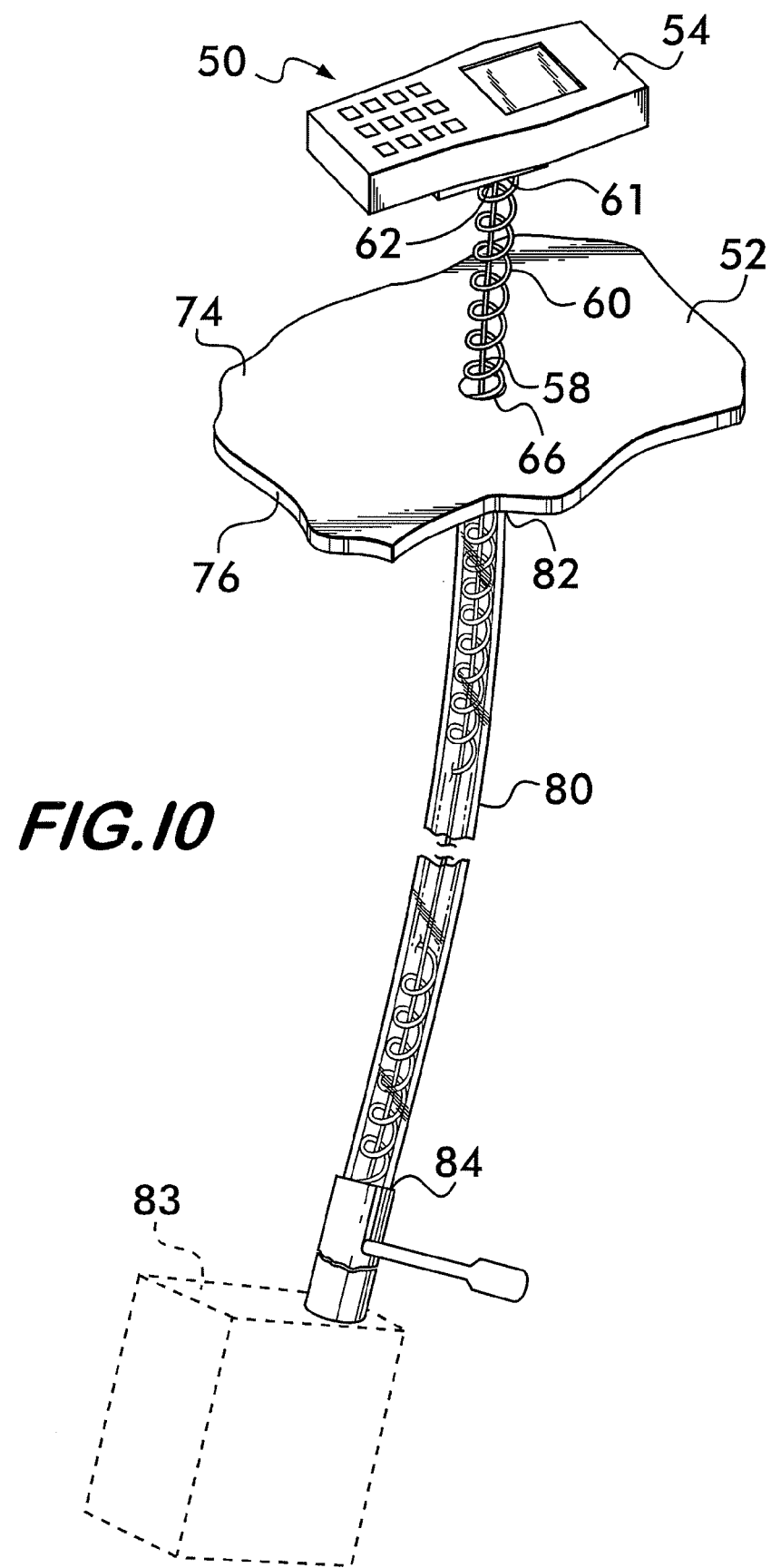
FIG. 10 is a an isometric view of a system for displaying an item in accordance with FIG. 9, shown without having a take up reel, shown with a portable phone in an extended position, away from its display shelf.

Alternatively, as can be seen in FIGS. 9 and 10, either no reel box 72 having the take-up reel is necessary to be attached to the second end of the tether 58 (if sufficient space is available) or a weight 83 may be provided on the second end 64 of the tether 58 to provide for retraction of the tether 58 and, therefore, the coiled cable 60 and the item 54 such that the item 54 moves to a position adjacent the shelf 52. Simply put, when a weight is used, the weight 83 pulls the item towards the shelf. 52. If no weight is used, the mass of the cable 60 and tether 58 may provide the retraction force (although, this is not likely to be an optimal approach).

The display shelf 52 has a top exposed side 74 and a bottom unexposed side 76. The top side 74 may have a stand 78 for holding the item 54 and the bottom side may have a hollow tube 80 connected thereto for accommodating and hiding the tether 54 and coiled cable 60. As seen in FIG. 1, the hollow tube may extend above the height of the top side 74 of the display shelf 52. This may be a separate assembly.

The top exposed side of the display shelf 74 may have a stand for holding the item (see FIG. 1) and the bottom side has the hollow tube 80 connected thereto for accommodating the tether and coiled cable. The hollow tube 80 has a top end 82 and a bottom end 84, where the top end 82 is secured to the display shelf 52. As stated, the tether 58 and coiled cable 60 are enclosed by the hollow tube 80 when the mount is seated.

Preferably, the tether 58 is fabricated from a cut resistant metal cable to prevent theft of the item.

The system for displaying an item 50 may further comprising an event sensor associated with the item. The event sensor detects the manipulation of, or approach of a user to the item and is coupled to a monitoring and alarm apparatus. The event sensor emits a sensor signal to the monitoring and alarm apparatus corresponding to the manipulation of, or approach of a user to the item. The monitoring and alarm apparatus includes a transmitter, arranged to automatically provide a wireless signal in the event that a person removes the item from the vicinity of the counter or other structure and a receiver arranged to receive the wireless signal to alert an authorized person of the removal of the item from the vicinity of the counter or other structure.

The event sensor is coupled to the item at a first end of the coiled cable and wherein the first end of the tether is coupled to the item and the second end of the coiled cable is coupled to the monitoring and alarm apparatus, the coiled cable arranged to carry an electrical signal generated by said event sensor, indicative of a person approaching, touching or picking up the item. A product information device may provide visual or audible information relating to the item.

The tether physically secures an electronic item to the display shelf to deter unauthorized removal of the item from the display shelf. The coiled cable preferably includes a power conductor and a sensor signal conductor. The power conductor and sensor signal conductor preferably have ends that are contained within a powerjack that couple to the electronic item for powering or charging the electronic item.

The mount 68 may be a cradle 70 that holds the item and which comprises members that releasably secure a powerjack to the item. In one particularly preferred embodiment, the mount is a battery-type mount adapted to replace a standard battery supplied with the item. Here, the mount utilizes the standard battery mounting fasteners supplied with the item. However, preferably, this battery-type mount would have theft resistant fasteners such that the item could not be taken without cutting the tether and cable.

It is within the broadest scope of the present invention to include the creation of statistics (e.g., via Checkpoint Inc.'s, CheckPro Manager® system) as to which product was picked up the most, hit lists, etc). This also includes the creation of hit lists regarding product interest of customers/sales data/etc. in connection with merchandize planning and control systems and CheckPro Manager® data. The statistics ad hit lists can be provided via Ethernet.

It is within the broadest scope of the present invention to include the securement of non-electronic devices while promoting them at the same time (e.g., bottles, razors, etc.).

While the invention has been described in detail and with reference to specific examples thereof, it will be apparent to one skilled in the art that various changes and modifications can be made therein without departing from the spirit and scope thereof.

What is claimed is:

1. A system for displaying an item, comprising:
    (a) a display shelf having an aperture therethrough;
    (b) a thin tether having a first end and a second end, said tether extending through said aperture wherein said first end of said tether is secured to a mount above a top exposed side of said display shelf and said second end of said tether is secured adjacent to a bottom, unexposed side of said display shelf, said first end of said tether having the mount thereon for secure connection of the first end of the tether to the item above the shelf;
    (c) a coiled cable, coiled around the tether and extending through said aperture, said coiled cable providing an electrical path for power and electrical signal to the item, said coiled cable having a first end and a second end, said first end secured adjacent to the mount, said second end terminating below the bottom unexposed side of said display shelf; and
    (d) wherein said mount is a battery-type mount adapted to replace a standard battery supplied with said item, said mount utilizing standard battery mounting fasteners supplied with the item, said battery-type mount having theft resistant fasteners.

* * * * *